(No Model.) 3 Sheets—Sheet 1.
W. O. COLEMAN.
SEED COTTON SEPARATOR AND CLEANER.

No. 282,057. Patented July 31, 1883.

WITNESSES
S. J. Nottingham
G. F. Downing

INVENTOR
Wm O Coleman
By his Attorney (No Model.) 3 Sheets—Sheet 2.
W. O. COLEMAN.
SEED COTTON SEPARATOR AND CLEANER.
No. 282,057. Patented July 31, 1883.
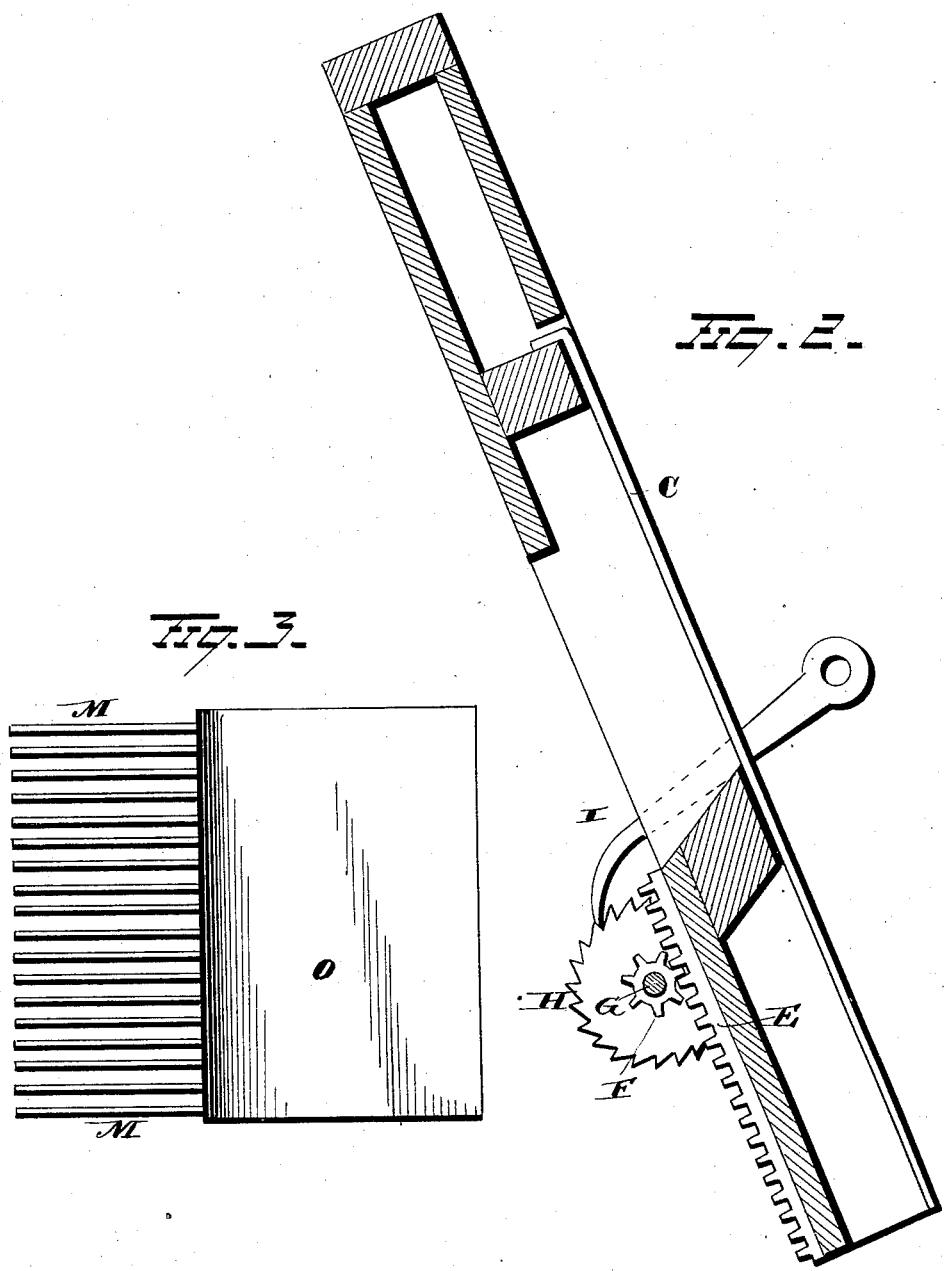

(No Model.) 3 Sheets—Sheet 3.

W. O. COLEMAN.
SEED COTTON SEPARATOR AND CLEANER.

No. 282,057. Patented July 31, 1883.

WITNESSES
S. G. Nottingham
G. J. Downing

INVENTOR
Wm O Coleman
By H. A. Symmon.
Attorney

UNITED STATES PATENT OFFICE.

WILLIAM O. COLEMAN, OF LITTLE ROCK, ARKANSAS.

SEED-COTTON SEPARATOR AND CLEANER.

SPECIFICATION forming part of Letters Patent No. 282,057, dated July 31, 1883.

Application filed March 1, 1883. (No model.)

*To all whom it may concern:*

Be it known that I, WILLIAM O. COLEMAN, of Little Rock, in the county of Pulaski and State of Arkansas, have invented certain new and useful Improvements in Seed-Cotton Separators and Cleaners; and I do hereby declare the following to be a full, clear, and exact description of the invention, such as will enable others skilled in the art to which it pertains to make and use the same.

My invention relates to an improvement in seed-cotton cleaners and separators, the object of the same being to provide a machine that will effectually remove all trash from the seed-cotton, and at the same time tear apart or separate the seed to which the cotton fiber adheres; and with these ends in view my invention consists in the parts and combinations of parts as will be more fully explained, and pointed out in the claims.

Figure 1:
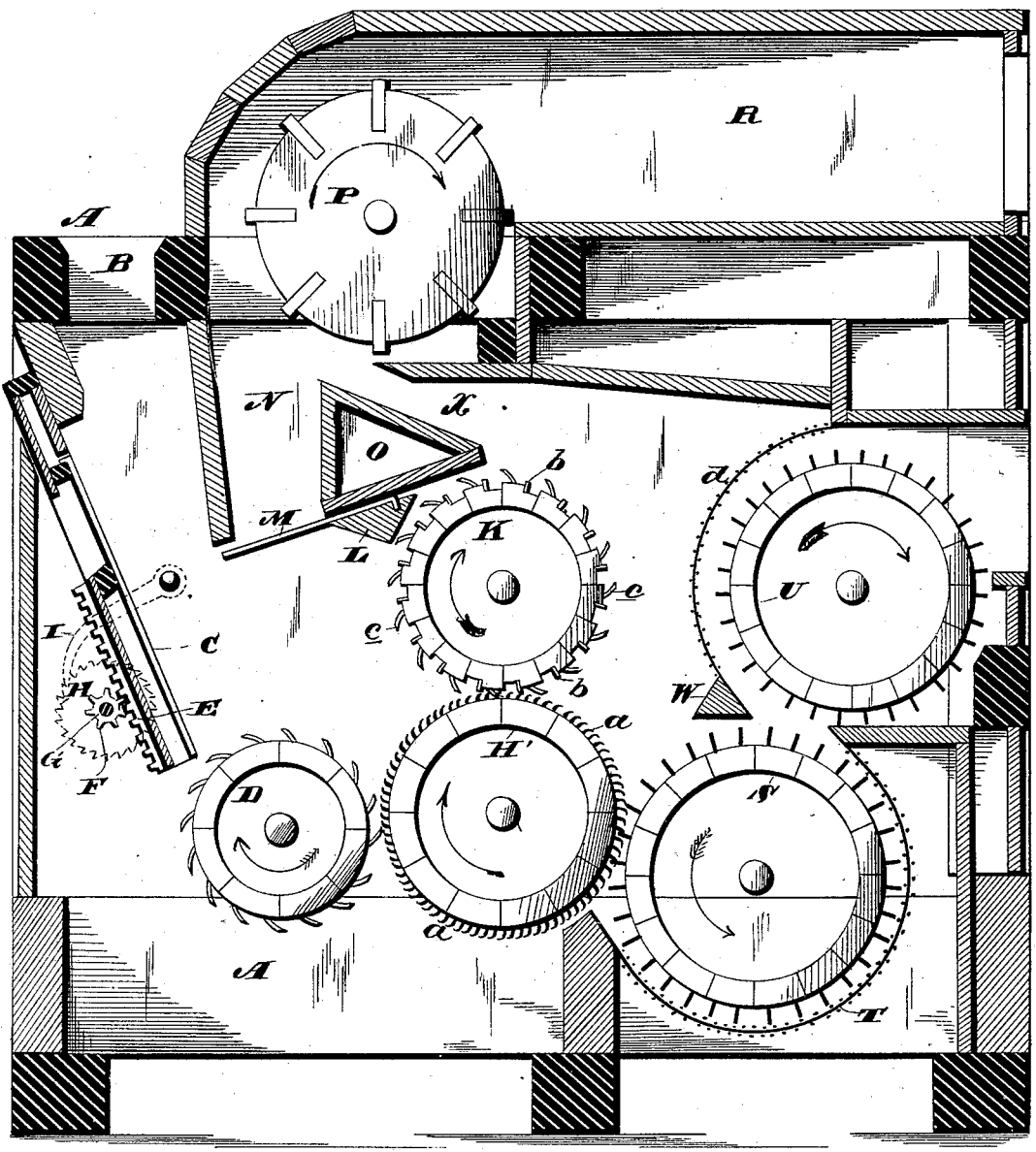
Figure 4:
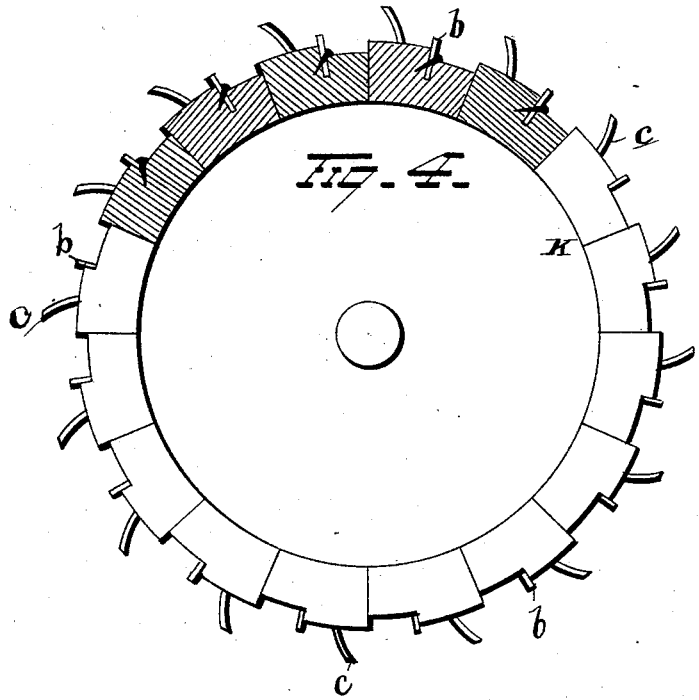
Figure 5:
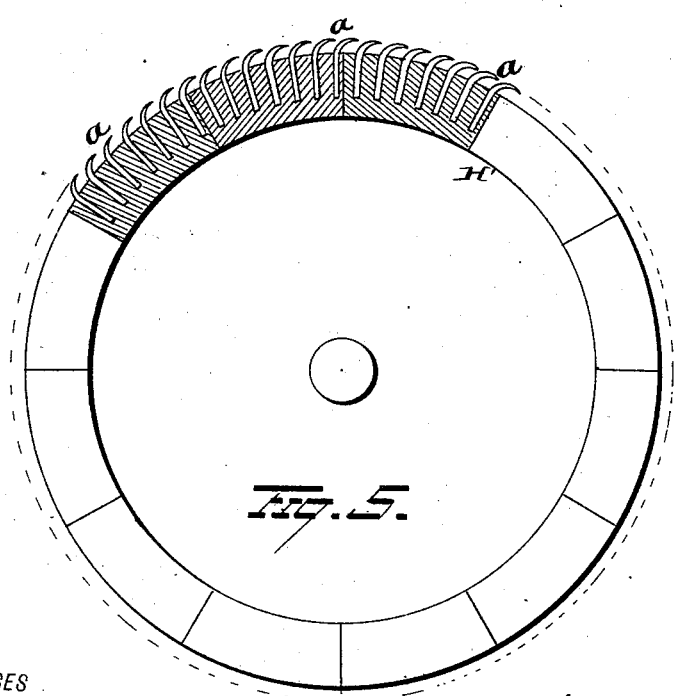

In the accompanying drawings, Figure 1 is a view in longitudinal vertical section of my improved machine. Fig. 2 is a detached view of the adjustable grating and the pawl and ratchet for holding it in position. Fig. 3 is a detached plan view of the rigid screen or grating situated at the inner end of the draft-flue. Fig. 4 is a transverse sectional view of the separating-cylinder, and Fig. 5 is a similar view of the hulling-cylinder.

A represents the frame or housing of the machine, of any suitable size and shape, provided with the hopper B, into which the seed-cotton, with its adhering trash, is deposited. The cotton, as it leaves the hopper, falls onto the grating C, which latter is adjustably secured to the frame A, in an inclined position, immediately under the hopper, and is adapted to deliver the seed-cotton onto the feeding-cylinder D, situated at the lower end of the grating. This grating consists of a frame-work of wood supporting a series of wire rods, each about three-sixteenths of an inch in diameter, and separated from each other about one-half of an inch from center to center, so as to enable loose leaves, sand, and twigs and portions of bolls to fall through between the wires before reaching the feeding-cylinder. The frame of the grating C is provided on its outer surface with one or more rack-bars, E, with which one or more pinions, F, engage, to raise or lower the grating, so as to increase or decrease the space between it and the feeding-cylinder. The pinions F are rigidly secured to the shaft G, which runs transversely across the machine-frame, and is provided on its outer end, outside of the frame, with a handle and with a ratchet-wheel, H, with which the pawl I engages. This pawl I holds the grating in position, and when it is desired to lower the grating the pawl is disengaged from the ratchet and the grating allowed to descend the proper distance before the pawl is re-engaged. A portion of the loose hulls and trash fed into the machine with the seed-cotton falls through the grating C, and through the space between the grating and feed-cylinder D, while the remainder, which is more intimately mixed with the seed-cotton, falls on the feed-cylinder, and from thence onto the separating-cylinder. The feeding-cylinder D is provided with rearwardly-inclined teeth, so arranged as to throw the seed-cotton, with its impurities, with considerable force onto the teeth of the separating-cylinder H', which movement tends to loosen the cotton from the bolls. The pieces of bolls, hulls, limbs, &c., falling onto the separating-cylinder, owing to the peculiar shape of the teeth thereof, do not adhere to them, but fall backward and down through the space between the feed and separating cylinder and out of the machine. The cylinder H' is larger than the feeding-cylinder, and is situated in the same horizontal plane and revolves in the same direction therewith, and is adapted to carry the seed-cotton upward to the hulling-cylinder. The teeth *a* of the separating-cylinder are provided with very sharp points, and are forwardly curved so as to overlap one another. These teeth readily take hold of the cotton fibers, but not the hulls, limbs, sticks, &c., and project only slightly out from the surface of the cylinder, and the curvature thereof is such that when the cotton falls thereon one or more cotton-seeds are firmly held and carried, with their adhering cotton fiber, past the teeth of the hulling-cylinder, while the seed-cotton not in direct engagement with the teeth is knocked back onto the grating C or feeding-cylinder D. Each cavity of a cotton-boll contains a lock of from six to twelve seeds of cotton firmly interlocked by the cotton fiber, and when a lock of cotton is thrown onto the separating-cylinder probably not more than one or two seeds will be directly engaged with the teeth thereof. The seed in direct engagement with the teeth will be carried past the hulling-cylinder, while the seed-cotton not in direct engagement with the teeth will be knocked backward, as before described.

The hulling-cylinder K is situated directly over the separating-cylinder, and is provided with rows of spikes or teeth $c$, adapted to move between the rows of teeth on the separating-cylinder. This hulling-cylinder is provided with longitudinal grooves running throughout its periphery, which form angular ribs, the striking-faces of which are provided with metallic strips $b$. These strips are secured to the cylinder in any desired manner, and are adapted to assist the rearwardly-inclined teeth $c$ in knocking back all seed of cotton or trash not in direct engagement with the teeth of the separating-cylinder. These teeth are so inclined as to prevent, as far as possible, the seed-cotton and trash from adhering thereto; but if any should, it is instantly knocked off by the clearing-brace L, the lower edge of which rests in close proximity to the teeth of the hulling-cylinder. This cylinder revolves in the direction shown, and knocks back the seed-cotton, as before described, which loosens the mass and liberates the sand and other impurities contained in the mass. The lighter particles of foreign matter, instead of falling down and mixing with the seed-cotton on the feed-cylinder or grating, are drawn upward through the dust screen or grating M and into the draft-flue N. This screen or grating is made of wire about one-sixteenth of an inch in diameter, placed about three-eighths of an inch apart from center to center. These wires are secured between the clearing-brace L and the triangular partition O, and prevent the seed-cotton from being drawn upward by the air-blast created by the fan P, situated in the dust-flue R, which latter can, if desired, connect with a dust-spout, for the purpose of conveying the lighter particles of impurities out of the building. The seed-cotton that adheres to the teeth of the separating-cylinder is carried around to the stripping-cylinder S, which is situated in a lower horizontal plane than the separating-cylinder. This cylinder S is larger than the separating-cylinder, and is provided with straight teeth arranged in alternating circular rows around the periphery. The teeth of the stripping-cylinder come between the teeth in the separating-cylinder, and as the stripping-cylinder revolves faster than the separating-cylinder the seed-cotton is taken therefrom by the stripping-cylinder, carried under the same, and upward to the discharge-cylinder. The stripping-cylinder S rests over and in close proximity to the wire-cloth T, the latter being curved concentrically with the said cylinder, and the seed-cotton, as it is stripped from the teeth of the separating-cylinder, is carried over this screen T, where it is further agitated to free the loose leaf and grit, which fall through the wire-cloth and out of the machine. The seed-cotton, instead of being discharged by this cylinder, as shown in my former patents, is carried upward thereby to the discharge-cylinder U, situated above the stripping-cylinder, but in close proximity thereto. The discharge-cylinder U is partly incased by the wire-cloth screen $d$, the lower end of which is secured to the triangular brace W, while the upper end thereof is secured to the machine-frame above the cylinder. The brace W between the two cylinders acts as a stop for the seed-cotton, and causes it to leave the stripping-cylinder and pass upward between the wire screen $d$ and the discharge-cylinder. While the cotton is thus passing upward it is further agitated and subjected to a strong current of air, which draws particles of leaves and other light trash through the screen $d$ into the draft-flue X, and from thence into the draft-flue N, and over the fan into the dust-flue and out of the machine. The cotton thus relieved of its impurities is carried over the discharge-cylinder and deposited in the discharge-spout in a clean and separated condition, and can be conveyed from these directly into a ginning-machine, if so desired. The several cylinders and fan revolve in the directions indicated by the arrows, and the parts are so geared as to give the necessary speed to the several parts.

My invention is simple in construction, is durable in use, and can be manufactured at a comparatively small expense.

It is evident that numerous changes in the construction and arrangement of the several parts might be resorted to without departing from the spirit of my invention, and hence I would have it understood that I do not limit myself to the exact construction or position of the several parts shown, but consider myself at liberty to make such changes and alterations as fairly fall within the spirit and scope of my invention.

Having fully described my invention, what I claim as new, and desire to secure by Letters Patent, is—

1. In a machine for cleaning and separating seed-cotton, the combination, with the receiving-hopper and inclined grating, of the feed-cylinder having rearwardly-inclined teeth, and the separating-cylinder having forwardly-curved teeth.

2. The combination, with the receiving-hopper, of an adjustable grate-frame, a feed-cylinder having rearwardly-inclined teeth, and a separating-cylinder having forwardly-curved teeth.

3. The combination, with the receiving-hopper and a feed-cylinder, of a grate-frame adjustably secured to the machine-frame and provided with a rack-bar, a pinion secured to a shaft and adapted to engage the rack-bar, a ratchet, and a pawl, as described.

4. The combination, with the hopper and feeding-cylinder, the latter being provided with rearwardly-inclined teeth, of the separating-cylinder provided with forwardly-curved teeth, and a hulling-cylinder, the teeth of which come between the teeth of the separating-cylinder.

5. The combination, with the feed-cylinder having rearwardly-inclined teeth, and the separating-cylinder having forwardly-curved teeth, of the hulling-cylinder having rearwardly-inclined teeth, and the clearing-brace, substantially as set forth.

6. The combination, with a separating-cylinder having forwardly-curved teeth, and means for feeding seed-cotton to the said cylinder, of a hulling-cylinder provided with ribs and teeth, the working-faces of the ribs being covered with metal strips which project out beyond the ribs, substantially as set forth.

7. The combination, with the separating-cylinder having forwardly-curved teeth, and the hulling-cylinder having rearwardly-inclined teeth, of a stripping-cylinder, the teeth of which come between the teeth of the separating-cylinder, a wire screen situated under the stripping-cylinder, and a discharge-cylinder, substantially as set forth.

8. The combination, with a separating-cylinder, and a hulling-cylinder situated above the same, of a stripping-cylinder, a discharge-cylinder situated above the latter, a wire screen partly embracing the discharge-cylinder, the draft-flue X, the fan, and dust-flue, substantially as set forth.

9. The combination, with the feed, separating, and hulling cylinders, the dust-screen, and draft-flue, of the stripping and discharge cylinders, the wire-cloth partly surrounding both of the latter, the flue X, fan, and dust-flue, substantially as set forth.

10. The combination, with a separating-cylinder having teeth curved in the direction of motion and adapted to grasp and hold the cotton-seed, of a hulling-cylinder situated above the separating-cylinder and having rearwardly-inclined teeth adapted to knock back the bolls, seeds, and seed-cotton not directly engaged by the teeth.

In testimony whereof I have signed this specification in the presence of two subscribing witnesses.

WILLIAM ORSBERN COLEMAN.

Witnesses:
　JAMES A. FONES,
　WM. A. COUNTS.